(12) United States Patent
Kölhi et al.

(10) Patent No.: US 10,911,561 B2
(45) Date of Patent: Feb. 2, 2021

(54) METHOD AND NETWORK NODE FOR CACHING WEB CONTENT

(71) Applicant: Telefonaktiebolaget LM Ericsson (publ), Stockholm (SE)

(72) Inventors: Johan Kölhi, Vaxholm (SE); John Orre, Saltsjöbaden (SE); Magnus Thulstrup, Åkersberga (SE); Dan Mathiasen, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 480 days.

(21) Appl. No.: 15/103,194

(22) PCT Filed: Dec. 12, 2013

(86) PCT No.: PCT/SE2013/051500
§ 371 (c)(1),
(2) Date: Jun. 9, 2016

(87) PCT Pub. No.: WO2015/088410
PCT Pub. Date: Jun. 18, 2015

(65) Prior Publication Data
US 2016/0323409 A1 Nov. 3, 2016

(51) Int. Cl.
*G06F 15/16* (2006.01)
*H04L 29/08* (2006.01)
*H04L 29/12* (2006.01)

(52) U.S. Cl.
CPC ...... *H04L 67/2847* (2013.01); *H04L 61/1511* (2013.01); *H04L 67/02* (2013.01); *H04L 67/141* (2013.01)

(58) Field of Classification Search
CPC . H04L 67/2847; H04L 61/1511; H04L 67/02; H04L 67/141
(Continued)

(56) References Cited

U.S. PATENT DOCUMENTS

| | | | | |
|---|---|---|---|---|
| 7,792,994 B1 * | 9/2010 | Hernacki | ................ | H04L 12/66 709/245 |
| 2002/0007404 A1 * | 1/2002 | Vange | ................... | G06F 9/5027 709/217 |

(Continued)

OTHER PUBLICATIONS

International Search Report and Written Opinion of the International Searching Authority, PCT Application No. PCT/SE2013/051500, dated Aug. 20, 2014.
(Continued)

*Primary Examiner* — Oscar A Louie
*Assistant Examiner* — Oluwatosin M Gidado
(74) *Attorney, Agent, or Firm* — Sage Patent Group

(57) ABSTRACT

A method of caching web content, performed by a network node such as a caching proxy, is disclosed. The method comprises receiving, from a client, a Domain Name System (DNS) resolution request comprising a hostname. The DNS resolution request is forwarded to a DNS server. A DNS resolution response comprising an Internet Protocol (IP) address corresponding to the hostname is received from the DNS server. The DNS resolution response is forwarded to the client. The method further comprises determining if the DNS resolution request relates to a web session, and if so, retrieving an index page from a web server associated with the received IP address, and caching the retrieved index page. Thereby, a subsequent initial Hyper Text Transfer Protocol (HTTP) request from the client for that index page can be accelerated.

19 Claims, 5 Drawing Sheets

(58) Field of Classification Search
USPC .......................................................... 709/219
See application file for complete search history.

(56) References Cited

U.S. PATENT DOCUMENTS

| | | | |
|---|---|---|---|
| 2002/0103778 A1* | 8/2002 | Saxena | G06F 17/30902 |
| 2003/0014603 A1* | 1/2003 | Sasaki | G06F 17/30902 |
| | | | 711/158 |
| 2008/0229025 A1* | 9/2008 | Plamondon | H04L 67/28 |
| | | | 711/126 |
| 2010/0106562 A1* | 4/2010 | Taylor | G06Q 30/02 |
| | | | 705/14.54 |
| 2010/0161760 A1* | 6/2010 | Maloo | H04L 29/12066 |
| | | | 709/219 |
| 2011/0153867 A1 | 6/2011 | van de Ven et al. | |
| 2012/0239731 A1* | 9/2012 | Shyamsunder | G06F 16/9535 |
| | | | 709/203 |
| 2014/0089661 A1* | 3/2014 | Mahadik | H04L 61/1511 |
| | | | 713/162 |
| 2014/0244937 A1* | 8/2014 | Bloomstein | H04L 29/08801 |
| | | | 711/136 |
| 2018/0041466 A9* | 2/2018 | Kagan | H04L 47/24 |

OTHER PUBLICATIONS

Cohen et al. "Prefetching the means for document transfer: a new approach for reducing Web latency" *Computer Networks*, 39(4), pp. 437-455, Jul. 15, 2002.

Xu et al. "Caching and Prefetching for Web Content Distribution" *Computing in Science and Engineering*, pp. 54-59, Jul./Aug. (2004).

* cited by examiner

METHOD AND NETWORK NODE FOR CACHING WEB CONTENT

CROSS REFERENCE TO RELATED APPLICATION

This application is a 35 U.S.C. § 371 national stage application of PCT International Application No. PCT/SE2013/051500, filed on 12 Dec. 2013, the disclosure and content of which is incorporated by reference herein in its entirety. The above-referenced PCT International Application was published in the English language as International Publication No. WO 2015/088410 A1 on 18 Jun. 2015.

TECHNICAL FIELD

The invention relates to a method of caching web content, a corresponding computer program and a corresponding computer program product, and a network node for caching web content.

BACKGROUND

Known solutions for caching web content, such as web pages provided by web servers, utilize HyperText Transfer Protocol (HTTP) proxies which act as intermediary for requests from a client seeking web content or other resources from a server. A caching proxy accelerates the response to such requests by utilizing a cache, where content from previous requests made by the same or others clients is stored. That is, caching proxies keep local copies of frequently requested resources, thereby increasing performance and decreasing latency. Caching proxies are, e.g., used by Internet Service Providers (ISPs) and large organizations.

Typically, a caching proxy is implemented as transparent proxy, i.e., it intercepts communication at the network layer without requiring any special client configuration. In other words, clients need not be aware of the existence of the proxy. A transparent proxy is normally located between the client and the Internet, with the proxy caching web content retrieved by clients accessing the Internet through the proxy.

Known HTTP proxies suffer from the problem that responses to client requests are only accelerated for subsequent requests for a particular resource, but not for the initial request retrieving that resource for the first time. In other words, known HTTP caching is effective only once a particular resource has been retrieved and stored in the cache of the HTTP proxy.

SUMMARY

It is an object of the invention to provide an improved alternative to the above techniques and prior art.

More specifically, it is an object of the invention to provide an improved caching of web content.

These and other objects of the invention are achieved by means of different aspects of the invention, as defined by the independent claims. Embodiments of the invention are characterized by the dependent claims.

According to a first aspect of the invention, a method of caching web content is provided. The method is performed by a network node, such as a caching proxy. The method comprises receiving, from a client, a Domain Name System (DNS) resolution request and forwarding the DNS resolution request to a DNS server. The DNS resolution request comprises a hostname. Preferably, the hostname identifies a content server, such as a web server. The method further comprises receiving, from the DNS server, a DNS resolution response and forwarding the DNS resolution response to the client. The DNS resolution response comprises an Internet Protocol (IP) address corresponding to the hostname. The method further comprises determining if the DNS resolution request relates to a web session, and if so, retrieving an index page and caching the retrieved index page. The index page is retrieved from a web server associated with the received IP address.

According to a second aspect of the invention, a computer program is provided. The computer program comprises instructions. The instructions are adapted, if executed on at least one processor, to implement the method according to an embodiment of the first aspect of the invention.

According to a third aspect of the invention, a computer program product is provided. The computer program product comprises a computer readable storage medium. The computer readable storage medium has the computer program according to the third aspect of the invention embodied therein.

According to a fourth aspect of the invention, a network node for caching web content, such as a caching proxy, is provided. The network node comprises means adapted to receive, from a client, a DNS resolution request and forward the DNS resolution request to a DNS server. The DNS resolution request comprises a hostname. The means are further adapted to receive, from the DNS server, a DNS resolution response and forward the DNS resolution response to the client. The DNS resolution response comprises an IP address corresponding to the hostname. The means are further adapted to determine if the DNS resolution request relates to a web session, and if so, retrieve an index page and cache the retrieved index page. The index page is retrieved from a web server associated with the received IP address.

In the present context, a hostname is a domain name assigned to a computer connected to the Internet. Usually, a hostname is a combination of the host's local name and its parent network's domain name. For instance, the hostname "www.newspaper.com" comprises the domain name "newspaper.com" which is associated with a network, e.g., of an organization publishing a newspaper, and the host's local name "www" assigned to a web server within that network. Throughout this disclosure, it is assumed that a hostname can be translated into an IP address, e.g., by means of DNS resolution.

The invention makes use of an understanding that an improved caching of web content may be achieved by intercepting DNS resolution requests which relate to web sessions. In the present context, a DNS resolution request relates to a web session if the hostname comprised in the DNS resolution request, or the IP address comprised in the DNS resolution response, identifies a content server providing web content, i.e., a web server. To this end, an IP address is received in a DNS resolution response if the hostname comprised in the corresponding DNS resolution request could be successfully resolved. If it is determined that a DNS resolution request relates to a web session, caching of an index page which is provided by the web server identified by the hostname is initiated. The index page, also known as start page or main page, is the page which a web server provides in response to receiving an HTTP request for the root directory of the web server, i.e., "HTTP GET/".

The initial caching of the index page takes place before a client from which the DNS resolution request originates has started an HTTP session towards the web server for retrieving the index page. Thereby, also the initial request for retrieving the index page may be accelerated, if the index page is retrieved and cached before an HTTP GET request for the index page is received from the client. In particular, this is the case if the backbone network through which the network node, i.e., the caching proxy, and content servers are connected is much faster than the access lines through which the clients and the caching proxy are connected.

According to an embodiment of the invention, the method further comprises, if the DNS resolution request relates to a web session, retrieving resources which are linked from the index page, and caching the retrieved resources. Thereby the entire index page, including linked resources such as pictures, ads, weather data, and so forth, can be provided in response to an HTTP GET request received from a client seeking to retrieve the index page. This is advantageous in that the index page can be rendered at the client immediately after it has received the HTTP response from the caching proxy, without further delay caused by subsequent requests for retrieving the linked resources.

According to an embodiment of the invention, the determining if the DNS resolution request relates to a web session comprises determining if the hostname comprises "www". Parsing the hostname comprised in the DNS resolution request is a simple and efficient way to determine whether the request relates to a web session. Optionally, the hostname may be parsed for strings other than "www" which are typically used in hostnames identifying web servers.

According to an embodiment of the invention, the determining if the DNS resolution request relates to a web session comprises looking up the received IP address in at least one list of IP addresses. Using one or more lists of IP addresses, such as white lists and black lists, is an efficient way of determining whether the request relates to a web session. Such lists may, e.g., be maintained by an administrator of the caching proxy. As an alternative, such lists may be built by means of learning which IP addresses point to web servers and which IP addresses point to content servers which are not web servers.

According to an embodiment of the invention, the at least one list of IP addresses comprises one or more IP addresses which are associated with web servers. Further, the determining if the DNS resolution request relates to a web session comprises determining if the received IP address is comprised in the list of IP addresses. That is, a white list of IP addresses is used.

According to an embodiment of the invention, the at least one list of IP addresses comprises one or more IP addresses which are associated with content servers other than web servers. Further, the determining if the DNS resolution request relates to a web session comprises determining if the received IP address is not comprised in the list of IP addresses. That is, a black list of IP addresses is used.

According to an embodiment of the invention, the determining if the DNS resolution request relates to a web session comprises determining if a Transmission Control protocol (TCP) connection to a port configured for HTTP at the received IP address can be established. To this end, the caching proxy attempts to open a TCP connection to a port which is known to be used for HTTP, such as port 80, at the IP address received in the DNS resolution response. In case of success, it is determined that the resolution request relates to a web session, and the index page can be retrieved immediately.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
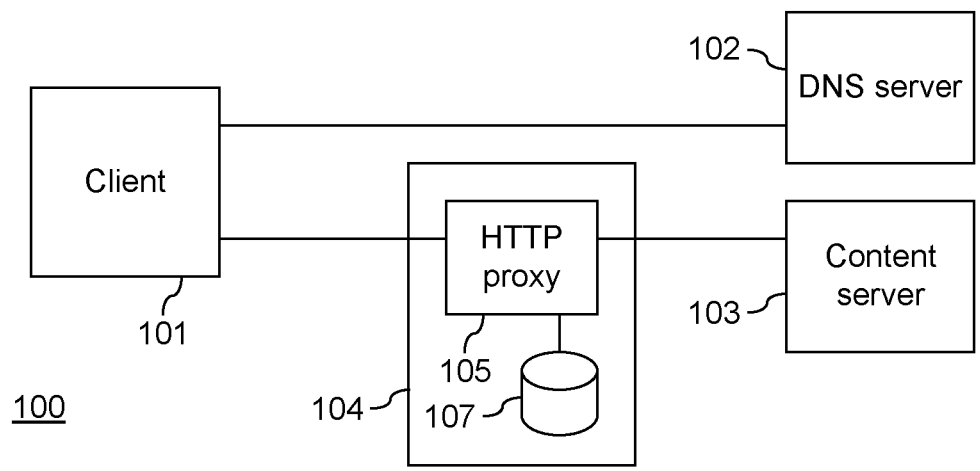
FIG. 1 illustrates a known system for caching web content.

In FIG. 1 a known system 100 for caching web content is illustrated. System 100 comprises a client 101, such as a computer, a mobile terminal, a User Equipment (UE), or any other computing device capable of communicating via a communications network, a content server 103, such as a web server providing web pages, a DNS server 102, and a caching proxy 104. In the present context, the communications network, interconnecting client 101, caching proxy 104, DNS server 102, and content server 103, may be any one or a combination of a Local Area Network (LAN), a Wireless LAN (WLAN), a cellular Radio Access Network (RAN), such as Global System for Mobile Communications (GSM), Universal Mobile Telecommunications System (UMTS), or Long Term Evolution (LTE), a corporate network, or the Internet. Client 101 is arranged for requesting web content, such as web pages, from content server 103, as is described further below, and, optionally, for processing or rendering retrieved web content. For instance, client 101 may be a computer or a mobile terminal executing a web browser allowing a user to access and view web pages.

Figure 2:
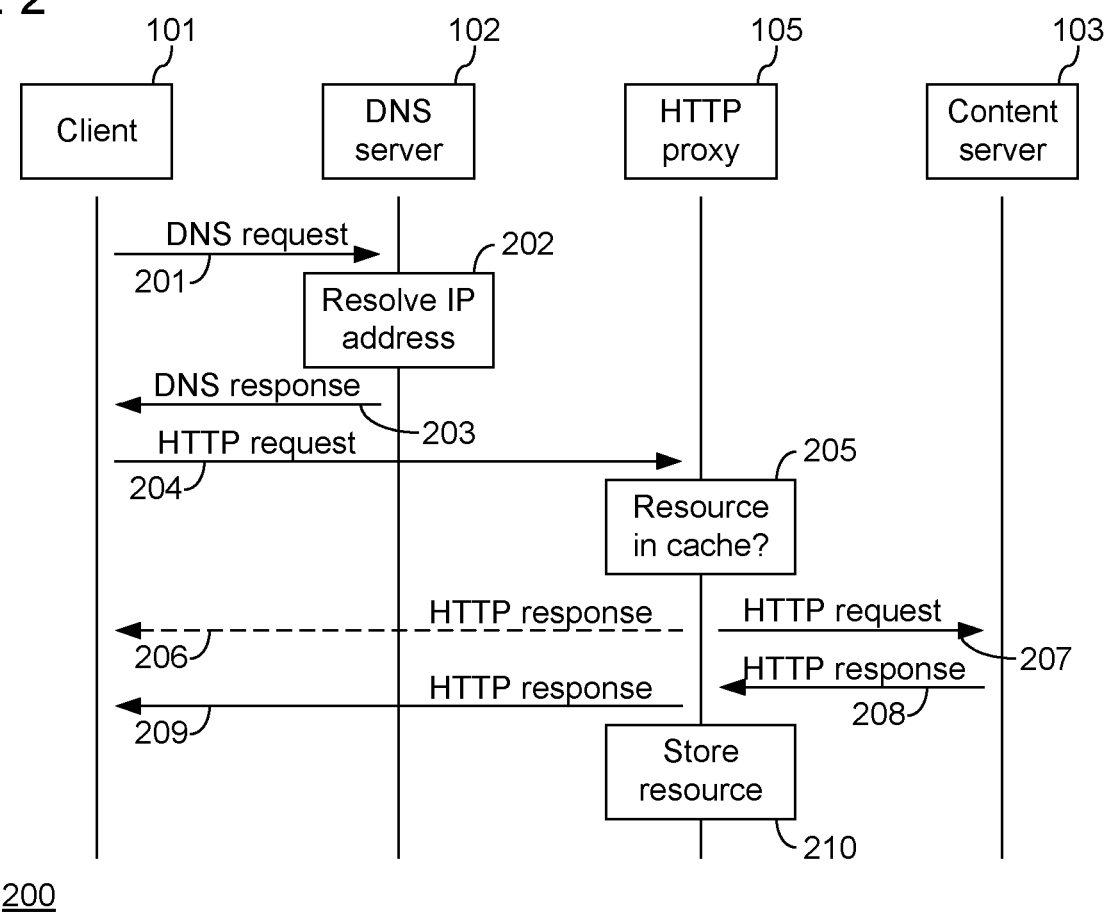
FIG. 2 shows a sequence diagram illustrating caching of web content, as is known in the art.

In the following, with reference to sequence diagram 200 shown in FIG. 2, a process of retrieving a web page is described. Sequence 200 is initiated by client 101 attempting to retrieve a web page from content server 103, e.g., in response to a user request to retrieve the web page, or in response to a request by an application being executed on client 101. More specifically, such a request amounts to requesting a particular resource from a content server identified by a hostname, such as "www.newspaper.com". The hostname may, e.g., be entered by the user into an address field of a web browser. Optionally, the user may enter a Uniform Resource Locator (URL), which is of the form "http://www.newspaper.com", where "http" denotes the scheme, or protocol, instructing client 101 how to connect to the host identified by the hostname. For the given URL, client 101 is instructed to perform an HTTP request to the host identified by the given hostname, using a port configured for HTTP requests, typically port number 80. The hostname "www.newspaper.com" is assigned to a content server on the Internet. Usually, the hostname is a combination of the host's local name, in this case "www", and the domain name, "newspaper.com".

Before performing an HTTP request 204 for the resource, client 101 resolves the hostname into an IP address, using a DNS resolver, such as DNS server 102. For this purpose, client 101 transmits a DNS resolution request 201 to DNS server 102. DNS resolution request 201 comprises the hostname of content server 103, i.e., "www.newspaper.com". In response to receiving request 201, DNS server 102 resolves, i.e., translates, the hostname into an IP address assigned to content server 103. If needed, DNS server 102 performs recursive queries to resolve the hostname, as is known in the art. Then, DNS server 102 transmits a DNS resolution response 203 to client 101, the response 203 comprising the IP address which is assigned to content server 103.

In response to receiving 203 the fully resolved IP address of content server 103, client 101 transmits an HTTP request 204 to content server 103 using the received IP address. Client 101 initiates request 204 by establishing a TCP connection to a particular port, typically port number 80, on content server 103 (not shown in FIG. 2). Once the TCP connection between client 101 and content server 103 is established, client 101 may retrieve resources from content server 103 by means of one or more HTTP GET requests. To this end, if the user of client 101 enters an URL into the address field of a web browser which is executed on client 101, client 101 requests the resource identified by the URL from content server 103. For instance, if the user enters "http://www.newspaper.com/first.html", client 101 retrieves a resource identified by "first.html" from a web server identified by "www.newspaper.com", such as content server 103. In case the user enters only "http://www.newspaper.com", client 101 retrieves the index page, also referred to as main page, i.e., the root page provided by content server 103, using "HTTP GET/" 204 over the established TCP connection. Usually, the index page is named "index.html", but HTTP servers, such as content server 103, may be configured to use any other name.

HTTP request 204 is intercepted by caching proxy 104, which here is assumed to be an HTTP proxy 105, i.e., a caching proxy for accelerating HTTP requests. In response to receiving request 204, HTTP proxy 105 determines 205 whether it has cached the resource requested by HTTP request 204, i.e., whether it has stored a copy of that resource in a local storage 107. If HTTP proxy 105 has cached the requested 204 resources, e.g., "www.newspaper.com/index.html", it retrieves the stored copy from storage 107 and transmits it to client 101 in HTTP response 206. In this case, HTTP request 204 by client 101 is accelerated by HTTP proxy 105 since a copy of the requested resource was locally stored at HTTP proxy 105.

On the other hand, if it is determined 205 that HTTP proxy 105 has not cached the requested 204 resource, it retrieves the resource from content server 103 by HTTP request 207. It will be appreciated that client 101 initiates request 207 by establishing a TCP connection to the HTTP port, typically port number 80, on content server 103 (not shown in FIG. 2). In response to receiving HTTP request 207, content server 103 provides the requested resource to HTTP proxy 105 by means of HTTP response 208. The requested resource, e.g., a file named "index.html", is cached 210 at HTTP proxy 105, i.e., stored in local storage 107, and forwarded to client 101 in HTTP response 209. In this latter scenario, the requested resource was not cached at HTTP proxy 105 and needed to be retrieved from content server 103. Thus, HTTP request 204 could not be accelerated. Typically, this is the case if the resource is requested 204 by client 101 for the first time, i.e., if HTTP request 204 is the initial request. Alternatively, this may be the case if too long time has passed since the resource was cached by HTTP proxy 105, according to rules or policies for caching web content at HTTP proxy 105, and needs to be requested 207 from content server 103.

It will be appreciated that separate TCP sessions are set up between client 101 and HTTP proxy 105, as well as between HTTP proxy 105 and content server 103, respectively, as is known in the art. If HTTP proxy 105 is configured as transparent proxy, communication is intercepted at the network layer without requiring any configuration at client 101.

Figure 3:
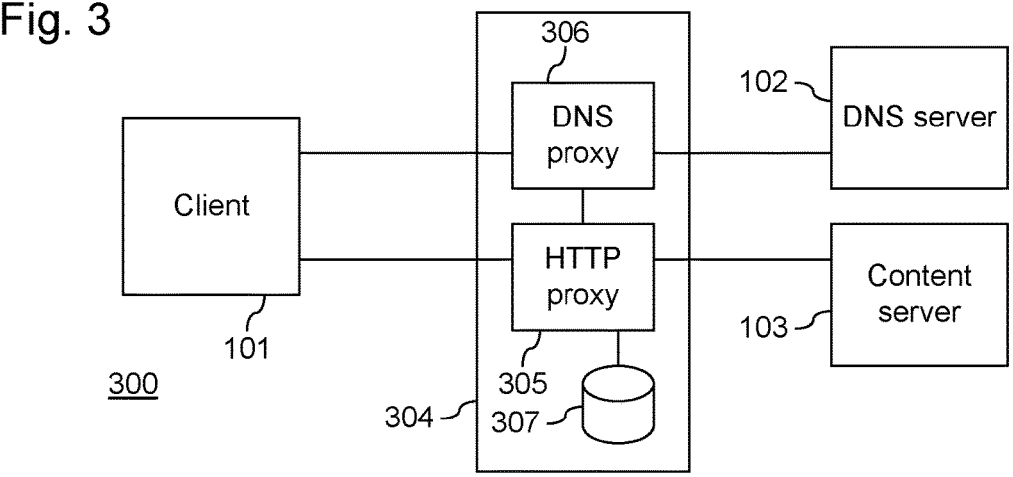
FIG. 3 illustrates a system for caching web content, in accordance with an embodiment of the invention.

In the following, a system 300 for caching web content, in accordance with an embodiment of the invention, is described with reference to FIGS. 3 and 4. Similar to system 100 described with reference to FIGS. 1 and 2, system 300 comprises a client 101, a DNS server 103, a content server 103, and a caching proxy 304. In contrast to caching proxy 104 described hereinbefore, caching proxy 304 comprises a DNS proxy 306 in addition to an HTTP proxy 305 and a local storage 307. DNS proxy 306 is adapted to intercept DNS resolution requests and DNS resolution responses transmitted between client 101 and DNS server 102, as is described below.

The DNS service relies frequently on the User Datagram Protocol (UDP), which is used for services where error checking and correction is either not necessary or performed at a higher level, avoiding the overhead of such processing at the network interface level. That is, DNS resolution requests and DNS resolution responses are typically carried on UDP. However, embodiments of the invention are not limited to UDP. Rather, embodiments of the invention may be envisaged which intercept DNS resolution requests and DNS resolution responses carried over protocols other than UDP, e.g., TCP.

Figure 4:
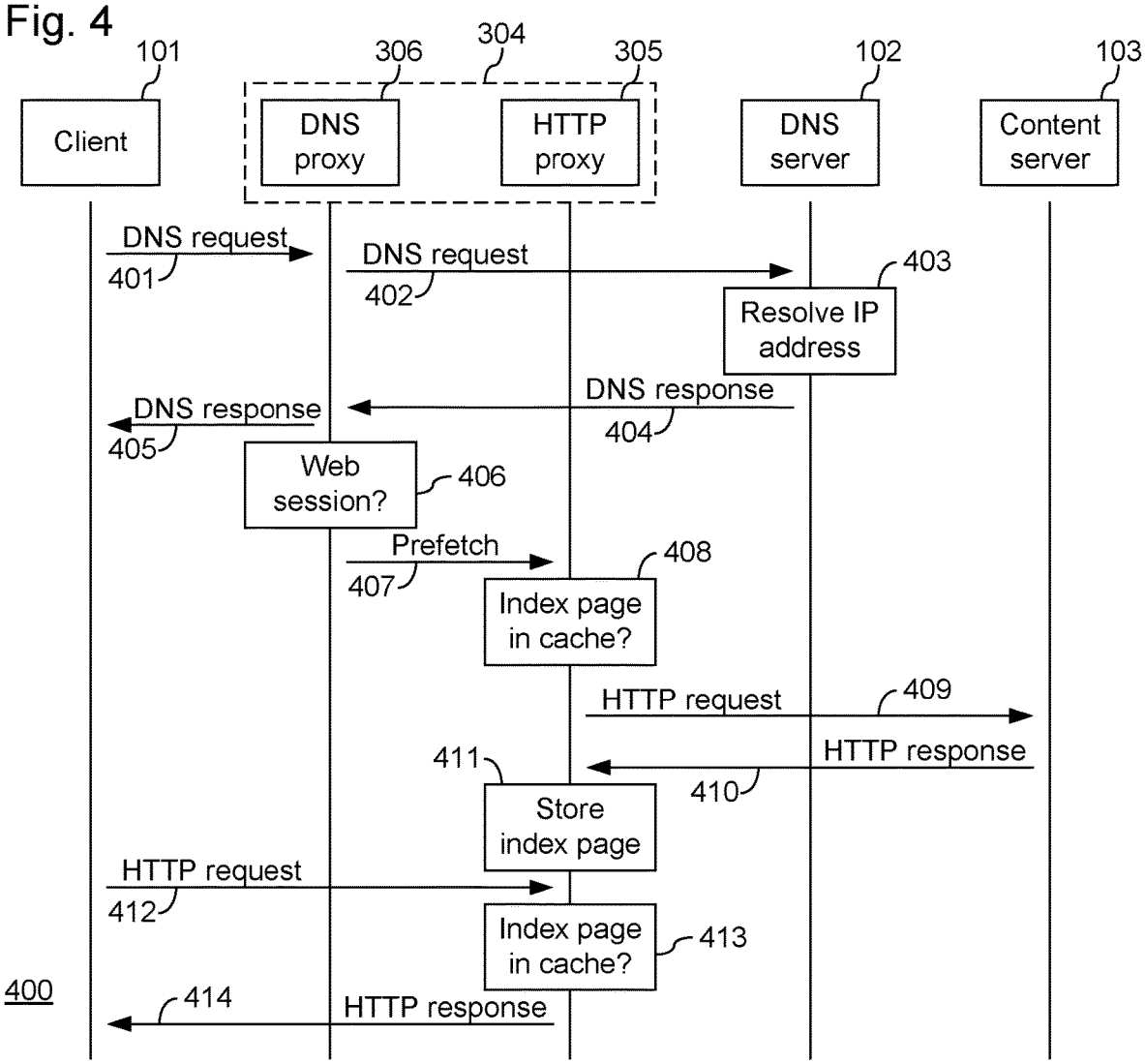
FIG. 4 shows a sequence diagram illustrating caching of web content, in accordance with an embodiment of the invention.

In FIG. 4, sequence diagram 400 illustrates caching of web content in accordance with an embodiment of the invention. Similar to what was described with reference to FIG. 2 above, sequence 400 is initiated by client 101 attempting to retrieve a web page from content server 103, e.g., "www.newspaper.com", over HTTP. In particular, it is assumed that client 101 attempts to retrieve an index page provided by "www.newspaper.com". This is, e.g., the case if a user of client 101 enters "http://www.newspaper.com" into the address field of a web browser being executed on client 101.

Before performing an HTTP request 412 for the index page, client 101 resolves the hostname of content server 103 into an IP address by transmitting DNS resolution request 401, comprising the hostname "www.newspaper.com", to DNS server 102. In contrast to the prior art illustrated in FIG. 2, DNS resolution request 401 is intercepted by DNS proxy 306 which forwards 402 the DNS resolution request to DNS server 102. In response to receiving 402 the request, DNS server 102 resolves 403 the hostname into an IP address assigned to content server 103, optionally performing recursive DNS queries to resolve the hostname. If the hostname can be successfully resolved, DNS server 102 transmits a DNS resolution response 404 to client 101, response 404 comprising the fully resolved IP address of content server 103. DNS resolution response 404 is intercepted by DNS proxy 306 and forwarded 405 to client 101.

After receiving DNS resolution response 404 from DNS server 102, DNS proxy 306 determines whether DNS resolution request 401 relates to a web session, as is described further below. If it is determined 406 that DNS resolution request 401 relates to a web session, DNS proxy 306 initiates retrieving an index page from a web server associated with the IP address received in DNS resolution response 404, i.e., content server 103. As is illustrated in FIG. 4, this may be accomplished by utilizing HTTP proxy 305. For instance, DNS proxy 306 may transmit a prefetch request 407 to HTTP proxy 305, prefetch request 407 comprising the received 404 IP address, thereby instructing HTTP proxy 305 to retrieve the index page from content server 103. Advantageously, HTTP proxy 305 starts retrieving the index page from content server 103 before an HTTP request 412 for that index page is received from client 101. This is achieved by establishing a TCP connection to the HTTP port, typically port number 80, on content server 103 (not shown in FIG. 4), and transmitting an HTTP request 409, "HTTP GET/", over the established TCP connection. In response to receiving HTTP request 409, content server 103 provides the requested index page to HTTP proxy 305 by means of HTTP response 410. The retrieved 410 index page is cached 411 at HTTP proxy 305, i.e., stored in local storage 307.

Meanwhile, in response to receiving the fully resolved IP address of content server 103 in DNS resolution response 405, client 101 transmits an HTTP request 412 for the index page to content server 103 using the received IP address. HTTP request 412 is intercepted by HTTP proxy 305. In response to receiving HTTP request 412, HTTP proxy 105 determines 413 whether it has cached the requested resource, i.e., the index page provided by content server 103, as is known in the art. If HTTP proxy 105 has cached the requested 412 index page, i.e., if a copy of the index page is stored in local storage 307, it retrieves the stored copy from storage 107 and transmits it to client 101 in HTTP response 414. In this case, HTTP request 412 by client 101 is accelerated by HTTP proxy 305 since a copy of the requested resource, the index page provided by content server 103, was locally stored at HTTP proxy 105.

If HTTP request 412 from client 101 is received at HTTP proxy 305 before it has received HTTP response 410 from content server 103, i.e., before HTTP proxy 305 has successfully prefetched the index page, HTTP proxy 305 may forward HTTP request 412 to content server 103 (not show in FIG. 4). Alternatively, and preferably, HTTP proxy 305 may wait until the requested index page is successfully retrieved from content server 103, as a result of HTTP request 409. That is, HTTP response 414 is transmitted to client 101 after HTTP response 410 is received from content server 103. In particular, this is the case if HTTP request 412 is received at HTTP proxy 305 shortly after it has initiated prefetching the index page, i.e., shortly after is has transmitted HTTP request 409 to content server 103. In order to handle situations in which prefetching by HTTP proxy 305 fails, HTTP proxy 305 may apply a predetermined time limit after HTTP request 409 is transmitted to content server 103 before it forwards HTTP request 412 (not shown in FIG. 4).

Preferably, DNS proxy 306 and HTTP proxy 305 are arranged in a single network node, caching proxy 304, optionally as separate functional units. Alternatively, DNS proxy 306 and HTTP proxy 305 may be arranged in separate network nodes which are interconnected for the purpose of transmitting prefetch request 407 from DNS proxy 306 to HTTP proxy 305. HTTP proxy 305 differs from a known HTTP proxy, such as HTTP proxy 105 described with reference to FIG. 2, in that it may prefetch an index page provided by a content server, such as content server 103, on request by DNS proxy 306. To this end, a prefetch request 407 is transmitted from DNS proxy 306 to HTTP proxy 305, prefetch request 407 comprising the hostname of the content server providing the index page. HTTP proxy 305 further differs from a known HTTP proxy in that an intercepted HTTP request 412 is not forwarded to content server 103 in case a prefetching request of an index page from content server 103 is pending, i.e., if HTTP request 412 is received after HTTP proxy has transmitted HTTP request 409 to content server 103 but before HTTP response 410 is received.

Thus, prefetching in accordance with an embodiment of the invention, described with reference to FIG. 4, is advantageous in that initial requests for index pages of web servers may be accelerated. Note that, if client 101, or a DNS agent in client 101, already has cached the IP address of content server 103, e.g., after a previous DNS resolution request, HTTP proxy 305 behaves like a known HTTP proxy and index pages are cached reactively by intercepting HTTP responses comprising index pages and caching the index pages. Further, if a resource other than the index page is requested, known reactive caching is performed. This is the case since DNS resolution request 401 only comprises the hostname of the content server providing the resource to be requested. Therefore, HTTP requests relating to resources other than the index page cannot be accelerated.

Further with reference to FIG. 4, after HTTP proxy 305 has received the index page in HTTP response 410, it may further retrieve resources which are linked from the retrieved index page. This may be achieved by parsing the retrieved index page for links, i.e., URLs, and requesting resources identified by the links by means of subsequent HTTP requests responses to content server 103 or other content servers, e.g., web servers, providing the linked resources. Such resources may, e.g., include pictures, ads, videos, embedded objects, and so forth. Subsequently, the requested linked resources are retrieved in HTTP responses and cached at HTTP proxy 305, i.e., stored in local storage 307. Preferably, all resources linked in the retrieved index page are retrieved, such that the entire content related to the index page, i.e., all content which is needed to completely render the index page by client 101, is cached.

DNS proxy 306 may determine 406 if DNS resolution request 401 relates to a web session in different ways. For instance, DNS proxy 306 may parse the hostname which is comprised in intercepted DNS resolution request 401, and in particular the local part of the hostname, for a string which is frequently used for web servers. Typically, hostnames identifying web servers on the Internet start with "www", "web", "w", "w3c", or "m" (indicating a web site adapted for mobile devices). It will be appreciated that embodiments of the invention are not limited to the provided examples.

According to another embodiment, DNS proxy 306 may determine 406 if DNS resolution request 401 relates to a web session by looking up the IP address comprised in DNS resolution response 404, i.e., the successfully resolved IP address which is associated which the hostname to which DNS resolution request 401 relates, in one or more lists of IP addresses. For instance, DNS proxy 306 may maintain, or be configured with, a list of IP addresses which are associated with web servers, i.e., a white list. In this case, DNS proxy 306 may determine if DNS resolution request 401 relates to a web session by determining if the received IP address is comprised in the list of IP addresses. That is, if the received IP address is comprised in the white list, DNS proxy 306 has determined that DNS resolution request 401 relates to a web session and requests 407 HTTP proxy 305 to prefetch the index page, as was described hereinbefore. Alternatively, or in addition, DNS proxy 306 may maintain, or be configured with, a list of IP addresses which are associated with content servers other than web servers, i.e., a black list. In this case, DNS proxy 306 may determine if DNS resolution request 401 relates to a web session by determining if the received IP address is not comprised in the list of IP addresses. That is, if the received IP address is not comprised in the black list, DNS proxy 306 has determined that DNS resolution request 401 relates to a web session and requests 407 HTTP proxy 305 to prefetch the index page, as was described hereinbefore. Note that in the latter case, the content server to which the DNS resolution request relates could still be a content server other than a web server, but the content server's IP address is not yet included in the black list.

According to a further embodiment, DNS proxy 306 may determine 406 if DNS resolution request 401 relates to a web session by determining if a TCP connection to a port configured for HTTP, typically port number 80, at the resolved IP address received in DNS resolution response 404 can be established. To establish a TCP connection, as is known in the art, a three-way handshake is used. More specifically, before a client attempts to connect with a server via TCP, the server must first bind to and listen at a port to open it up for TCP connections (passive open). Once the passive open is established by the server, the client attempting to connect with the server may initiate an active open. To establish a TCP connection, the following three-way handshake occurs:

SYN: The active open is performed by the client attempting to connect with the server by sending a SYN to the server, setting the TCP segment's sequence number to a random value A.

SYN-ACK: In response, the server replies with a SYN-ACK. The acknowledgment number is set to one more than the received sequence number, i.e., A+1, and the sequence number that the server chooses for the packet is another random number, B.

ACK: Finally, the client attempting to connect with the server sends an ACK back to the server. The sequence number is set to the received acknowledgement value, i.e., A+1, and the acknowledgement number is set to one more than the received sequence number, i.e., B+1.

If the above handshake is performed successfully, both the client attempting to connect with the server and the server have received an acknowledgment of the TCP connection.

To this end, with reference to FIG. 4, DNS proxy 306 may determine 406 if DNS resolution request 401 relates to a web session by attempting to establish a TCP connection with a port configured for HTTP at the server associated with received IP address. If DNS proxy 306 can establish the TCP connection, using the three-way handshake described above, it has determined 406 that DNS resolution request 401 relates to a web session and transmits prefetch instruction 407 to HTTP proxy 305. Otherwise, i.e., if DNS proxy 306 does not succeed in establishing the TCP connection, is has determined 406 that DNS resolution request 401 does not relate to a web session. Accordingly, prefetch instruction 407 is not transmitted to HTTP proxy 305.

Figure 5:
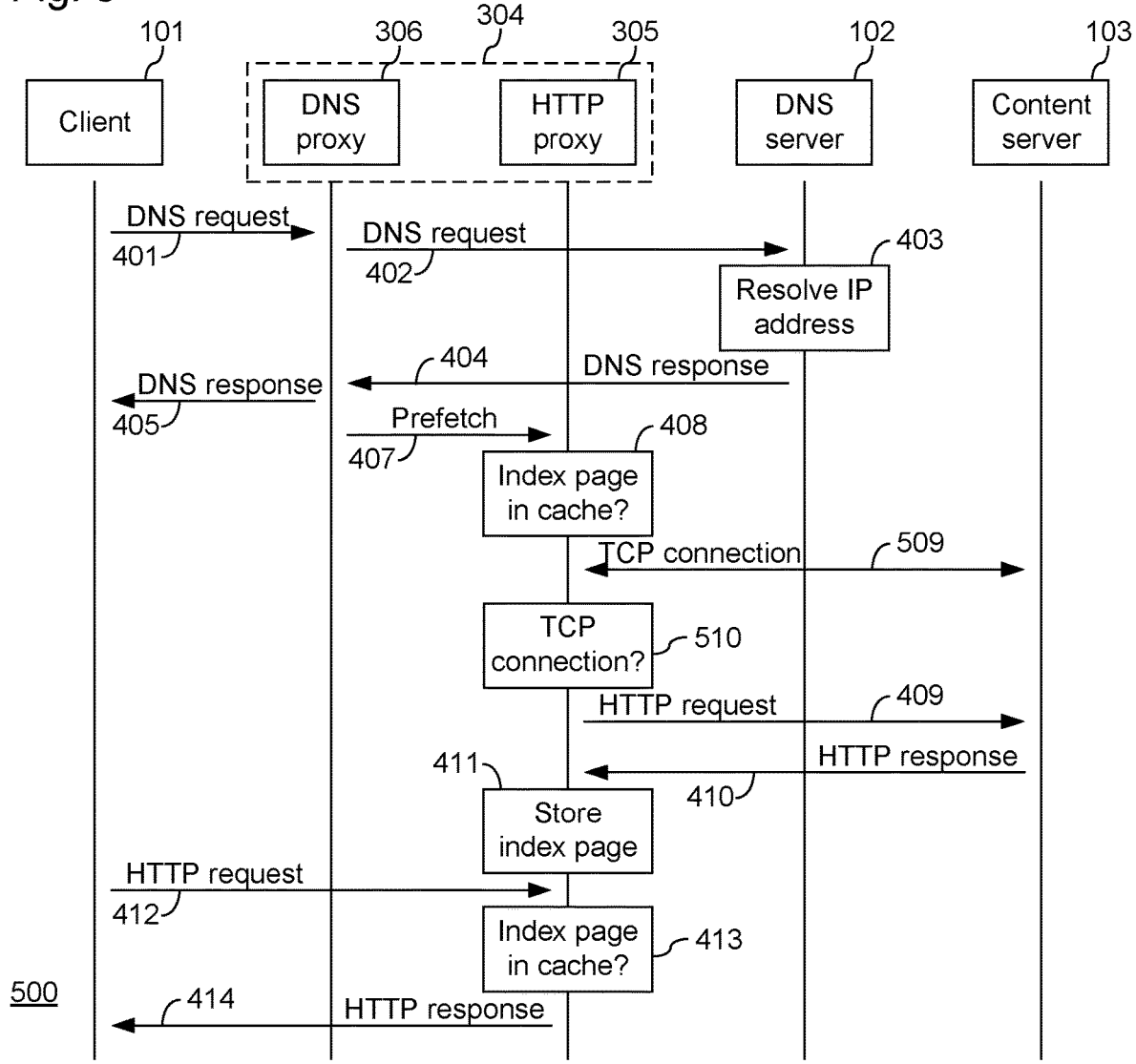
FIG. 5 shows a sequence diagram illustrating caching of web content, in accordance with another embodiment of the invention.

An alternative way of determining if DNS resolution request 401 relates to a web session, in accordance with an embodiment of the invention, is illustrated in FIG. 5. Sequence diagram 500 is similar to sequence diagram 400 of FIG. 4 in that client 101 transmits DNS resolution request 401 which is intercepted and forwarded 402 to DNS server 102 by DNS proxy 306. Further, DNS resolution response 403, which comprised the resolved 403 IP address associated with the hostname comprised in DNS resolution request 401, is transmitted by DNS server 102 and intercepted and forwarded 404 to client 101 by DNS proxy 306. In contrast to FIG. 4, DNS proxy 306 does not determine if DNS resolution request 401 relates to a web session, e.g., by inspecting the hostname comprised in DNS resolution request 401 or by looking up the IP address comprised in DNS resolution response 404. Rather, DNS proxy 306 requests HTTP proxy 305, by means of prefetch signal 407 comprising the resolved IP address comprised in DNS resolution response 404, to attempt to retrieve an index page provided by a web server associated with the resolved IP address. In response to receiving prefetch request 407, HTTP proxy 305 checks 408 whether it has cached the index page. If not, HTTP proxy 305 attempts to establish a TCP connection 509 to port 80, or any other port number configured for HTTP, with the server associated with the resolved IP address, such as content server 103, in accordance with the three-way handshake described above. If HTTP proxy 305 can establish TCP connection 509, it is determined 510 that DNS resolution request 401 relates to a web session. Subsequently, HTTP proxy 305 retrieves the index page from content server 103 by HTTP request 409 and HTTP response 410, preferably over the established TCP connection 509. The retrieved index page is cached 411 in local storage 307. Otherwise, if HTTP proxy 305 cannot establish TCP connection 509, it is determined 510 that DNS resolution request 401 does no relate to a web session. Accordingly, the index page is not retrieved.

It will be appreciated that, since an HTTP session requires an established TCP connection, an attempt by HTTP proxy 305 to establish a TCP connection with content server 103 may be considered to be part of HTTP request 409 in FIG. 4. Effectively, if HTTP proxy 305 fails to establish a TCP connection with content server 103, it may be determined that DNS resolution request 401 does not relate to a web session.

Embodiments of the invention may utilize any one, or a combination of, the described ways of determining if DNS resolution request 401 relates to a web session. Advantageously, the at least one list of IP addresses may be updated based on learned IP addresses, based on success or failure of establishing TCP connection 509 with an HTTP port at a server which is associated with a resolved IP address (cf. FIG. 5), and/or retrieving an index page from content server 103 by means of HHTP request 409 (cf. FIG. 4). To this end, if the index page can be retrieved by means of HTTP request 409, or if TCP connection 509 with an HTTP port at content server 103 can be established, HTTP proxy 305 and/or DNS proxy 306 have verified that the received IP address is associated with web server, i.e., DNS resolution request 401 does relate to a web session. Consequently, the resolved IP address may be added to the list of IP addresses which are associated with web servers, i.e., the white list. Correspondingly, the received IP address may be added to the list of IP addresses which are associated with content servers other than web servers, i.e., the black list, if the index page cannot be retrieved, or if TCP connection 509 with an HTTP port at content server 103 cannot be established.

Figure 6:
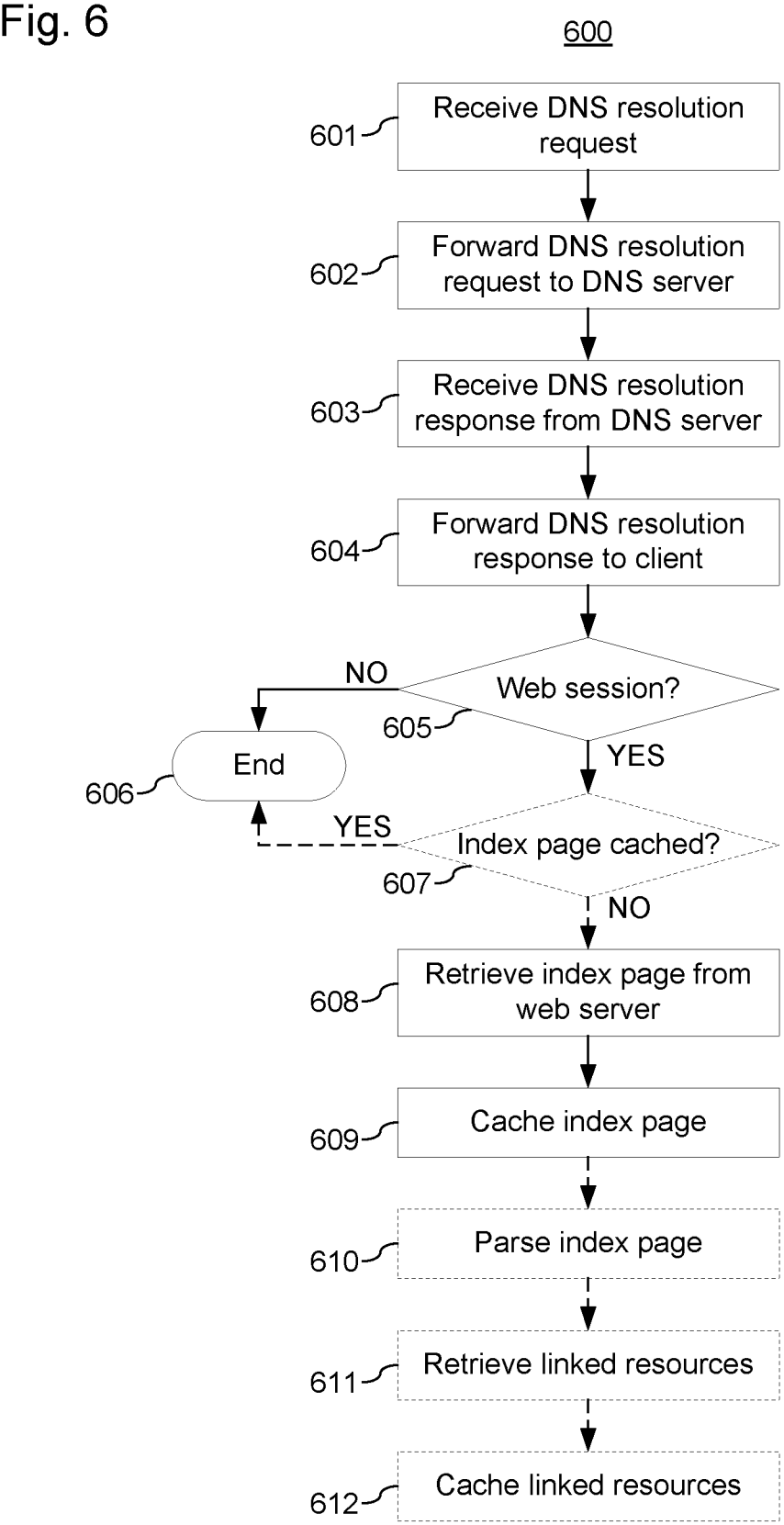
FIG. 6 shows a method of caching web content, in accordance with an embodiment of the invention.

In the following, a method 600 of caching web content, in accordance with an embodiment of the invention, is described with reference to FIG. 6 and what has been described hereinbefore. Method 600 may be performed by a network node 304, such as a caching proxy, an HTTP proxy, or any other network node for routing packets in a communications network, in particular packets carried over TCP, UDP, and HTTP.

Method 600 comprises receiving 601, from a client 101, a DNS resolution request comprising a hostname, forwarding 602 the DNS resolution request to a DNS server 102, receiving 603, from DNS server 102, a DNS resolution response comprising an IP address corresponding to the hostname, and forwarding 604 the DNS resolution response to client 101. Method 600 further comprises determining 605 if the DNS resolution request relates to a web session, and if so, retrieving 608 an index page from a web server 103 associated with the received IP address and caching 609 the retrieved index page. If it is determined 605 that the DNS resolution request does not relate to a web session, method 600 terminates 606.

Optionally, method 600 may comprise determining 607 whether the index page which is to be retrieved 608 is already cached. If the index page is cached, method 600 terminates 606 without prefetching the index page. Otherwise, if the index page is not cached, it is retrieved 608 from the web server 103 to which the DNS resolution request relates.

Optionally, method 600 may further comprise, if the DNS resolution request relates to a web session, parsing 610 the retrieved 608 index page for resources which are linked from the index page, retrieving 611 such linked resources, and caching 612 the retrieved linked resources. This is advantageous in that the complete index page can be provided to client 101 on request, thereby reducing the delay until the complete index page can be rendered at client 101.

The step of determining 605 if the DNS resolution request relates to a web session may comprise determining if the hostname comprises "www", or any other string commonly used for web servers.

Alternatively, or additionally, the step of determining 605 if the DNS resolution request relates to a web session may comprise looking up the received IP address in at least one list of IP addresses, such as a white list and/or a black list, as was described hereinbefore.

Alternatively, or additionally, the step of determining 605 if the DNS resolution request relates to a web session may comprise determining if a TCP connection to a port configured for HTTP, typically port number 80, at the received IP address can be established, as was described hereinbefore. In particular, determining if a TCP connection to a port configured for HTTP at the received IP address can be established may be part of an attempt to prefetch, i.e., retrieve 608 the index page from web server 103.

It will be appreciated that method 600 may further comprise additional steps in accordance with embodiments of the invention described hereinbefore.

Figure 7:
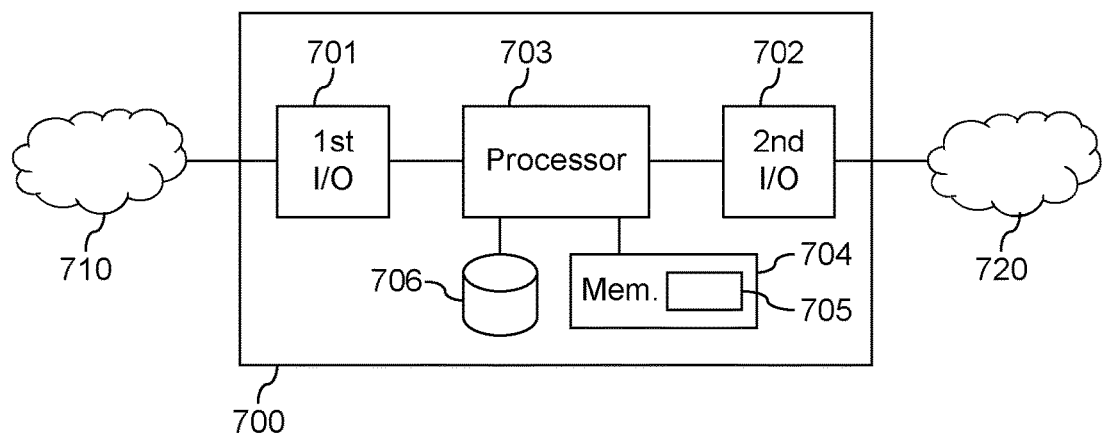
FIG. 7 illustrates a network node for caching web content, in accordance with an embodiment of the invention.

A network node 700 for caching web content, in accordance with an embodiment of the invention, is now described with reference to FIG. 7 and what has been described hereinbefore. Network node 700 may, e.g., be a caching proxy, an HTTP proxy, or any other network node for routing packets in a communications network, in particular packets carried over TCP, UDP, and HTTP. Network node 700 comprises at least a first network interface 701, and preferably a second network interface 702, and is adapted for routing and/or intercepting packets transmitted between a network node, e.g., client 101, connected to first network interface 701, and a network node, e.g., DNS server 102 and/or content server 103, connected to second network interface 702. Alternatively, if network node 700 only comprises a single network interface 701, it is adapted for routing and/or intercepting packets transmitted between network nodes connected to network interface 701. If network node 700 comprises two network interfaces 701 and 702, network node 700 can be considered to interconnect two networks 710 and 720 which are logically and/or physically separated by network node 700. For instance, network 710 may include access lines to clients, whereas network 720 includes the backbone through which content servers and DNS servers are interconnected.

Network node 700 further comprises processing means 703, such as one or more general purpose processors or dedicated processors, a memory 704, and a local storage 706 for caching web content, such as web pages and other resources, in particular resources which can be retrieved by means of HTTP requests. Network node 700 is adapted for storing a computer program 705 comprising instructions which may be executed on processing means 703. Thereby, network node 700 is operative to perform caching of web content in accordance with an embodiment of the invention, such as method 600 described with reference to FIG. 6.

To this end, network node 700 is operative to, by virtue of computer program 705, to receive, from a client 101, a DNS resolution request comprising a hostname, forward the DNS resolution request to a DNS server 102, receive, from DNS server 102, a DNS resolution response comprising an IP address corresponding to the hostname, and forward the DNS resolution response to client 101. Network node 700 is further operative to determine if the DNS resolution request relates to a web session, and if so, retrieve an index page from a web server 103 associated with the received IP address, and cache the retrieved index page.

Optionally, network node 700 may further be operative to determine whether the index page which is to be retrieved is already cached, and only prefetch the index page if it is not cached.

Optionally, network node 700 may further be operative to, if the DNS resolution request relates to a web session, parsing the retrieved index page for resources which are linked from the index page, retrieving such linked resources, and caching the retrieved linked resources. This is advantageous in that the complete index page can be provided to client 101 on request, thereby reducing the delay until the complete index page can be rendered at client 101.

Network node 700 may be operative to determine if the DNS resolution request relates to a web session by determining if the hostname comprises "www", or any other string commonly used for web servers.

Alternatively, or additionally, network node 700 may be operative to determine if the DNS resolution request relates to a web session by looking up the received IP address in at least one list of IP addresses, such as a white list and/or a black list, as was described hereinbefore.

Alternatively, or additionally, network node 700 may be operative to determine if the DNS resolution request relates to a web session by determining if a TCP connection to a port configured for HTTP, normally port number 80, at the received IP address can be established, as was described hereinbefore. In particular, determining if a TCP connection to a port configured for HTTP at the received IP address can be established may be part of an attempt to retrieve the index page from web server 103.

It will be appreciated that network node 700 may further be operative to perform in accordance with other embodiments of the invention described hereinbefore.

Network node 700 may be provided with computer program 705 by means of a computer program product such as memory 704, a portable storage means such as a CD, a DVD, or a USB memory, or by downloading computer program 705 to network node 700, e.g., over a communications network to which network node 700 is connected.

Figure 8:
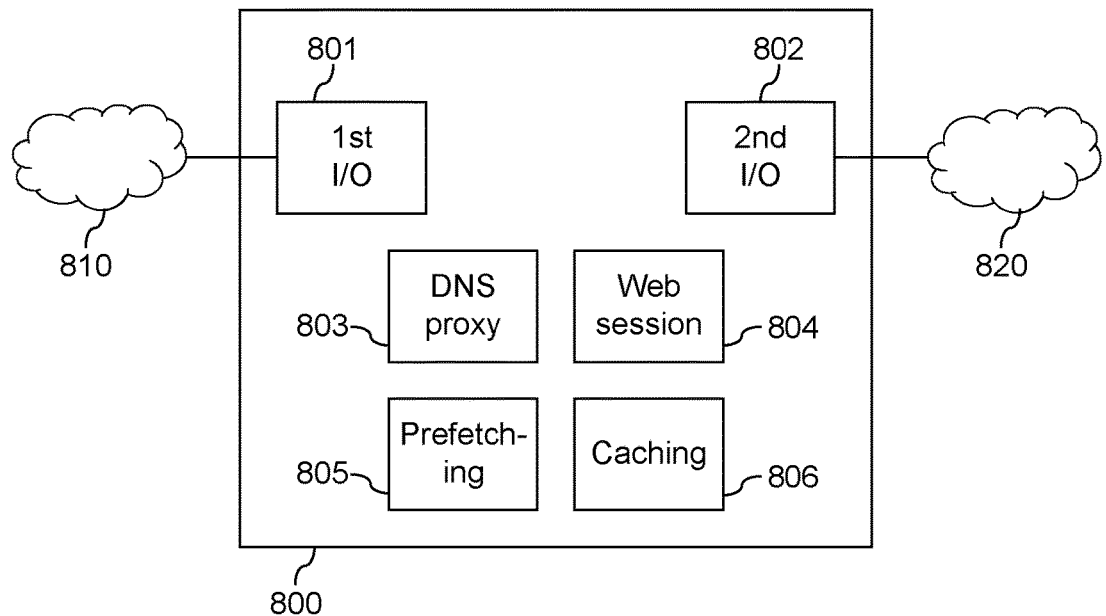
FIG. 8 illustrates a network node for caching web content, in accordance with another embodiment of the invention.

An alternative embodiment 800 of the network node for caching web content is described with reference to FIG. 8. Network node 800 comprises at least a first network interface module 801, and preferably a second network interface module 802, configured for routing and/or intercepting packets transmitted between a network node, e.g., client 101, connected to first network interface module 801, and a network node, e.g., DNS server 102 and/or content server 103, connected to second network interface module 802. Alternatively, network node 800 may only comprise a single network interface module 801 configured for routing and/or intercepting packets transmitted between network nodes connected to network interface 801. If network node 800 comprises two network interfaces modules 801 and 802, network node 800 can be considered to interconnect two networks 810 and 820 which are logically and/or physically separated by network node 800. For instance, network 810 may include access lines to clients, whereas network 820 includes the backbone through which content servers and DNS servers are interconnected.

Network node 800 further comprises a DNS proxy module 803 configured to receive, from a client 101, a DNS resolution request comprising a hostname, forward the DNS resolution request to a DNS server 102, receive, from DNS server 102, a DNS resolution response comprising an IP address corresponding to the hostname, and forward the DNS resolution response to client 101. Network node 800 further comprises a web session module 804 configured to determine if the DNS resolution request relates to a web session, a prefetching module 805 configured to, if the DNS resolution request relates to a web session, retrieve an index page from a web server 103 associated with the received IP address, and a caching module 806 configured to cache the retrieved index page, e.g., in a local storage which caching module 806 is provided with.

Optionally, prefetching module 805 and/or caching module 806 may be configured to determine whether the index page which is to be retrieved is already cached, and only prefetch the index page if it is not cached.

Optionally, prefetching module 805 may further be adapted to, if the DNS resolution request relates to a web session, parse the retrieved index page for resources which are linked from the index page and retrieve such linked resources. Accordingly, caching module 806 may further be configured to cache the retrieved linked resources. This is advantageous in that the complete index page can be provided to client 101 on request, thereby reducing the delay until the complete index page can be rendered at client 101.

Web session module 804 may further be configured to determine if the DNS resolution request relates to a web session by determining if the hostname comprises "www", or any other string commonly used for web servers.

Alternatively, or additionally, web session module 804 may further be configured to determine if the DNS resolution request relates to a web session by looking up the received IP address in at least one list of IP addresses, such as a white list and/or a black list, as was described hereinbefore.

Alternatively, or additionally, web session module 804 and/or prefetching module 805 may further be configured to determine if the DNS resolution request relates to a web session by determining if a TCP connection to a port configured for HTTP, normally port number 80, at the received IP address can be established, as was described hereinbefore. In particular, prefetching module 805 may be configured for determining if a TCP connection to a port configured for HTTP at the received IP address can be established as part of an attempt to retrieve the index page from web server 103.

It will be appreciated that network node 800 may comprise further modules, and that the modules comprised in network node 800 may further be configured to perform in accordance with other embodiments of the invention described hereinbefore.

The person skilled in the art realizes that the invention by no means is limited to the embodiments described above. On the contrary, many modifications and variations are possible within the scope of the appended claims.

The invention claimed is:

1. A method of caching web content, the method being performed by a network node, the method comprising:
    intercepting a Domain Name System, DNS, resolution request comprising a hostname transmitted from a client device and directed towards a DNS server,
    forwarding the intercepted DNS resolution request to the DNS server,
    receiving, from the DNS server, a DNS resolution response comprising an Internet Protocol, IP, address corresponding to the hostname of the intercepted DNS resolution request,
    forwarding the DNS resolution response corresponding to the hostname of the intercepted DNS resolution request to the client,
    responsive to forwarding the DNS resolution response corresponding to the hostname of the intercepted DNS resolution request to the client, determining the intercepted DNS resolution request relates to a web session based on the received IP address,
    responsive to determining the intercepted DNS resolution request relates to a web session, transmitting a first HTTP request towards a web server associated with the received IP address of the DNS resolution response, the first HTTP request comprising a request for an index page, wherein the index page is a page which the web server provides in response to the web server receiving a first HTTP request from the network node for a root directory of the web server,
    responsive to transmitting the first HTTP request towards the web server, receiving the index page from the web server before the client has started an HTTP session towards the web server for retrieving the index page for the web session, and responsive to receiving the index page from the web server, caching the retrieved index page for the web session, before the client has started an HTTP session towards the web server for retrieving the index page for the web session.

2. The method according to claim 1, wherein caching the retrieved index page for the web session comprises
retrieving resources which are linked from the retrieved index page, and
caching the retrieved resources.

3. The method according to claim 1, wherein the determining the intercepted DNS resolution request relates to a web session comprises determining the hostname comprises "www".

4. The method according to claim 1, wherein the determining the intercepted DNS resolution request relates to a web session comprises looking up the received IP address in at least one list of IP addresses.

5. The method according to claim 4, wherein the at least one list of IP addresses comprises one or more IP addresses which are associated with web servers, and wherein the determining the intercepted DNS resolution request relates to a web session comprises determining the received IP address is comprised in the list of IP addresses.

6. The method according to claim 4, wherein the at least one list of IP addresses comprises one or more IP addresses which are associated with content servers other than web servers, and wherein the determining the intercepted DNS resolution request relates to a web session comprises determining the received IP address is not comprised in the list of IP addresses.

7. The method according to claim 1, wherein the determining the intercepted DNS resolution request relates to a web session comprises determining a Transmission Control protocol, TCP, connection to a port configured for HTTP at the received IP address can be established.

8. The method according to claim 1, wherein the network node comprises a local storage for caching the retrieved index page from the web server.

9. The method according to claim 1 further comprising:
after receiving from the web server the response to the first HTTP request, intercepting a second HTTP request directed towards the web server, the intercepted HTTP comprises a request from the client for the index page of the web session;
responsive to intercepting the second HTPP request from the client, transmitting to the client a HTTP response to the intercepted second HTTP request, wherein the HTTP response comprises the cached received index page.

10. The network node according to claim 1, wherein the memory further comprises instructions that when executed by the processor further cause the processor to operate to:
after receiving from the web server the response to the first HTTP request, intercept a second HTTP request directed towards the web server, the intercepted HTTP comprises a request from the client for the index page of the web session;
responsive to intercepting the second HTPP request from the client, transmit to the client a HTTP response to the second HTTP request, wherein the HTTP response comprises the cached received index page.

11. A computer program product comprising a non-transitory computer readable storage medium storing instructions, the instructions when executed on at least one processor of a network node causes the at least one processor to operate to:
intercept a Domain Name System, DNS, resolution request comprising a hostname transmitted from a client device and directed towards a DNS server,
forward the intercepted DNS resolution request to the DNS server,
receive, from the DNS server, a DNS resolution response comprising an Internet Protocol, IP, address corresponding to the hostname of the intercepted DNS resolution request,
forward the DNS resolution response corresponding to the hostname of the intercepted DNS resolution request to the client,
responsive to forwarding the DNS resolution response corresponding to the hostname of the intercepted DNS resolution request to the client, determine the intercepted DNS resolution request relates to a web session based on the received IP address,
responsive to determining the intercepted DNS resolution request relates to a web session, transmit a first HTTP request towards a web server associated with the received IP address of the DNS resolution response, the first HTTP request comprising a request for an index page, wherein the index page is a page which the web server provides in response to the web server receiving a first HTTP request from the network proxy node for a root directory of the web server,
responsive to transmitting the first HTTP request towards the web server, receive the index page from the web server before the client has started an HTTP session towards the web server for retrieving the index page for the web session, and
responsive to receiving the index page from the web server, cache the retrieved index page for the web session before the client has started an HTTP session towards the web server for retrieving the index page for the web session.

12. A network node for caching web content, the network node comprising:
a processor; and
a memory coupled to the processor and storing instructions that when executed by the processor cause the processor to operate to:
intercept a Domain Name System, DNS, resolution request comprising a hostname transmitted from a client device and directed towards a DNS server,
forward the intercepted DNS resolution request to the DNS server,
receive, from the DNS server, a DNS resolution response comprising an Internet Protocol, IP, address corresponding to the hostname of the intercepted DNS resolution request,
forward the DNS resolution response corresponding to the hostname of the intercepted DNS resolution request to the client,
responsive to forwarding the DNS resolution response corresponding to the hostname of the intercepted DNS resolution request to the client, determine the intercepted DNS resolution request relates to a web session based on the received IP address,
responsive to determining the intercepted DNS resolution request relates to a web session, transmit a first HTTP request towards a web server associated with the received IP address of the DNS resolution response, the first HTTP request comprising a request for an index page, wherein the index page is a page which the web server provides in response to the web server receiving a first HTTP request from the network node for a root directory of the web server,
responsive to transmitting the first HTTP request towards the web server, receive the index page from the web server before the client has started an HTTP session towards the web server to retrieve the index page for the web session, and
responsive to receiving the index page from the web server, cache the retrieved index page, wherein caching the retrieved index page comprises caching the retrieved index page for the web session, before the client has started an HTTP session towards the web server for retrieving the index page for the web session.

13. The network node according to claim 12, wherein the memory further comprises instructions that when executed by the processor further causes the processor to operate to cache the retrieved index page for the web session by:
retrieving resources which are linked from the index page, and
caching the retrieved resources.

14. The network node according to claim 12, wherein the memory further comprises instructions that when executed by the processor further causes the processor to operate to determine the intercepted DNS resolution request relates to a web session by determining the hostname comprises "www".

15. The network node according to claim 12, wherein the memory further comprises instructions that when executed by the processor further causes the processor to operate to determine the intercepted DNS resolution request relates to a web session by looking up the received IP address in at least one list of IP addresses.

16. The network node according to claim 15, wherein the at least one list of IP addresses comprises one or more IP addresses which are associated with web servers, and
wherein the memory further comprises instructions that when executed by the processor further causes the processor to operate to determine the intercepted DNS resolution request relates to a web session by determining the received IP address is comprised in the list of IP addresses.

17. The network node according to claim 15, wherein the at least one list of IP addresses comprises one or more IP addresses which are associated with content servers other than web servers, and
wherein the memory further comprises instructions that when executed by the processor further causes the processor to operate to determine the intercepted DNS resolution request relates to a web session by determining the received IP address is not comprised in the list of IP addresses.

18. The network node according to claim 12, wherein the memory further comprises instructions that when executed by the processor further causes the processor to operate to determine the intercepted the DNS resolution request relates to a web session by determining a Transmission Control protocol, TCP, connection to a port configured for HTTP at the received IP address can be established.

19. The network node according to claim 13, further comprising:
a local storage for caching the retrieved index page from the web server.

* * * * *